(12) United States Patent
Mori et al.

(10) Patent No.: US 6,413,187 B1
(45) Date of Patent: Jul. 2, 2002

(54) TOROIDAL TYPE CONTINUOUSLY VARIABLE TRANSMISSION AND METHOD OF MANUFACTURING LINK

(75) Inventors: Haruhito Mori, Kawasaki; Toshifumi Hibi, Yokosuka; Masatoshi Fukuyama, Fuji, all of (JP)

(73) Assignee: Nissan Motor Co., Ltd., Yokohama-city (JP)

(*) Notice: Subject to any disclaimer, the term of this patent is extended or adjusted under 35 U.S.C. 154(b) by 0 days.

(21) Appl. No.: 09/669,740

(22) Filed: Sep. 26, 2000

(30) Foreign Application Priority Data

Sep. 27, 1999 (JP) .............................. 11-271859

(51) Int. Cl.[7] .............................. F16H 15/38

(52) U.S. Cl. .............................. 476/42; 476/40

(58) Field of Search .............................. 476/40, 42, 46

(56) References Cited

FOREIGN PATENT DOCUMENTS

| JP | 7-174201 | 7/1995 |
|----|----------|--------|
| JP | 9-42401  | 2/1997 |
| JP | 10-205599 | 8/1998 |

*Primary Examiner*—Allan D. Herrmann
(74) *Attorney, Agent, or Firm*—Foley & Lardner (57) ABSTRACT

In a toroidal type continuously variable transmission, shoulder portions are formed on a trunnion which opposes an upper link or a lower link, and projecting portions are formed on the links which slidably contact the shoulder portions when the links execute swinging movement. The end portions of the projecting portions which slidably contact the shoulder portions are formed with arcuate faces.

4 Claims, 9 Drawing Sheets

TOROIDAL TYPE CONTINUOUSLY VARIABLE TRANSMISSION AND METHOD OF MANUFACTURING LINK

FIELD OF THE INVENTION

This invention relates to a toroidal type continuously variable transmission (referred to hereafter as CVT) used in a vehicle or the like, and to a method for manufacturing a link thereof.

BACKGROUND OF THE INVENTION

Japanese Patent Laying Open Publication Heisei 7-174201 published in 1995 discloses the CVT. In this CVT, mutually opposed power rollers are interposed and held between coaxially disposed input and output disks. Further, trunnions which support the shafts of these power rollers are supported so as to be capable of displacement in the axial direction as well as rotatable around their axes.

SUMMARY OF THE INVENTION

With this type of the CVT, the upper ends and the lower ends of the trunnions, which are provided as mutually opposed, are respectively connected together by an upper link and a lower link. Due to this, when a trunnion is displaced along its axial direction, the upper link and the lower link execute swinging movement. At this time, shoulder portions formed upon the trunnions and projecting portions on the upper link or on the lower link may come into contact with one another.

If the projecting portions of the links are formed as sharp corner portions, these corner portions often bite at the shoulder portions of the trunnions when they contact slidably into the shoulder portions of the trunnions. Due to the occurrence of this biting, the movement of the trunnions, in other words the gyration movement of the power rollers, is obstructed, which causes resistance during speed changing. As a result this becomes a cause of hysteresis in the speed change characteristic of the transmission.

Further, if a variation should be present in the shapes of the corner portions, then the sliding resistance set up to the movement of each of the trunnions undesirably becomes different. That is to say, when the projecting portions contact slidably into the trunnions, although one of the trunnions may gyrate easily, it may happen that the other trunnion cannot gyrate easily due to biting of the corner portions. Accordingly, the problem has occurred of hysteresis being engendered in the speed changing characteristic due to variation of the sliding resistance acting in the directions of gyration of the power rollers, which causes deterioration in the accuracy of speed change control.

The objective of the present invention is to prevent the occurrence of hysteresis in the speed change characteristic by rendering uniform the contact condition of the links and the shoulder portions of the trunnions.

In order to achieve above object, this invention provides a toroidal type continuously variable transmission, comprising: a rotation shaft; input disks which are arranged coaxially with said rotation shaft and is driven thereby; output disks which are arranged coaxially with said rotation shaft and opposes said input disks; a pair of trunnions arranged in opposite positions on both sides of said rotation shaft and movable in its axial direction of said rotation shaft and also around its axial direction of said rotation shaft, each said trunnions comprising rotation shafts formed at both end portions of said trunnions, and offset portions which are offset by a predetermined amount from said rotation shafts between said trunnions and said rotation shafts; an actuator which drives each of said pair of said trunnions in the mutually opposite axial direction of the trunnions; power rollers which are supported by said trunnions and are gripped between said input disk and said output disk; links each of which is respectively formed with aperture portions into which said respective rotation shafts of said trunnions are inserted; and spherical joints provided between the outer peripheries of said rotation shafts and said through holes; shoulder portions formed on said trunnions opposing said links; and projecting portions formed upon said links and capable of contacting slidably into said shoulder portions of said trunnions when said links execute swinging movement; wherein end portions of said projecting portions are formed with arcuate faces.

Further this invention provides a method for manufacturing a link for a toroidal type continuously variable transmission, wherein said link is provided with aperture portions at its both ends through which said rotation shaft portions of said trunnions are passed, and with projecting portions which can contact slidably into said shoulder portions of said trunnions when said trunnions execute swinging movement, and end portions of said projecting portions which contact slidably into said shoulder portions of said trunnions are formed with arcuate faces.

DESCRIPTION OF THE PREFERRED EMBODIMENTS

Figure 1:
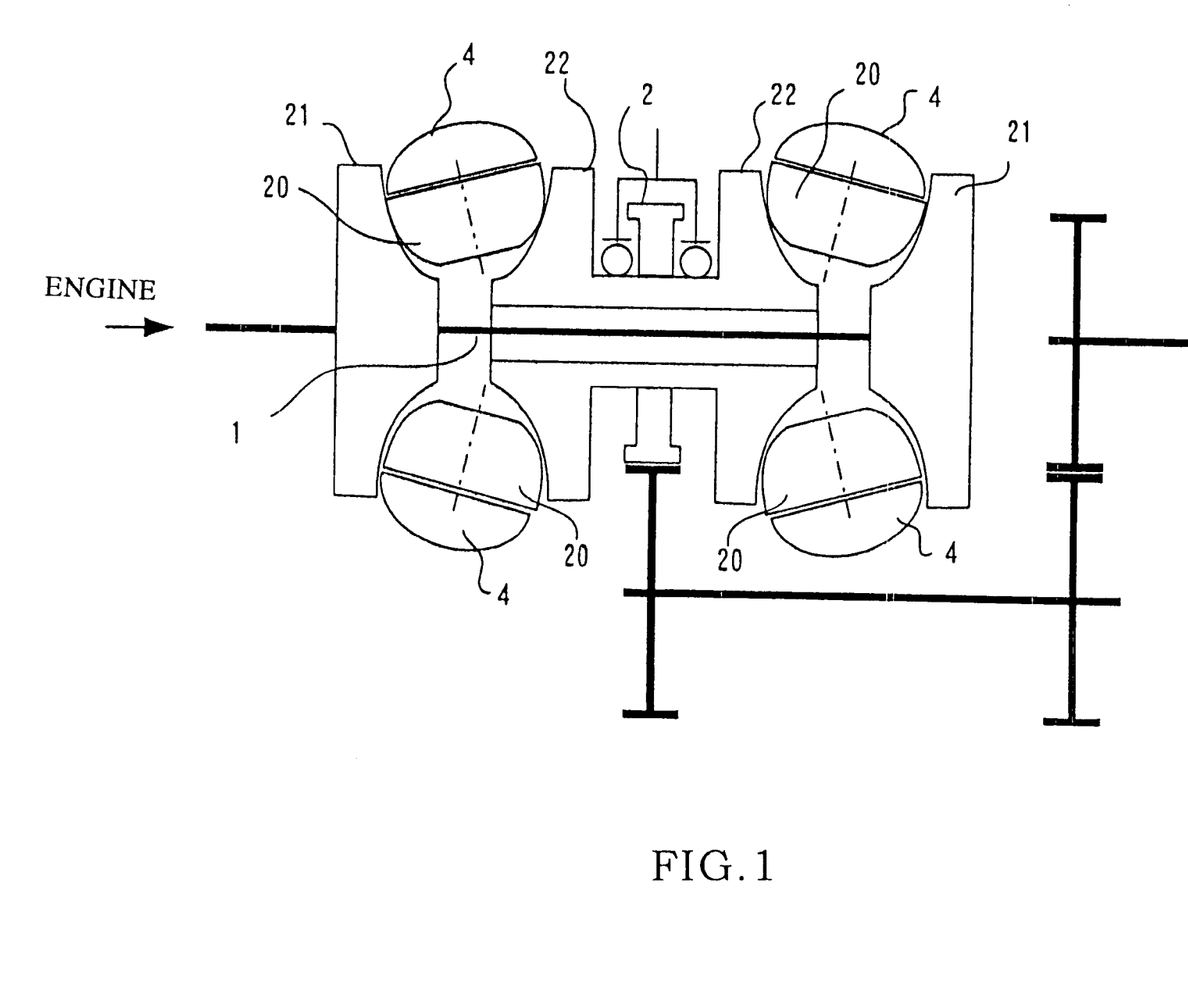
FIG. 1 is an outline view of a toroidal type continuously variable transmission according to this invention.

Referring to FIG. 1, the CVT comprises two pairs of input disks 21 and output disks 22. Two pairs of power rollers 20 are gripped between each of the input disks 21 and the output disks 22. Next, referring to FIG. 2, each of the power rollers 20 is supported upon a trunnion 4 via a pivot shaft 24. An upper link 5 and a lower link 6 are respectively connected to the opposite upper and lower ends of each of the trunnions 4.

Next, referring to FIG. 1, the pair of input disk 21 and the output disks 22 is coaxially mounted upon an input shaft 1. The input disks 21 are rotationally driven by the input shaft 1. The power rollers 20 transmit the rotation of the input disks 21 to the output disks 22. The rotation of the output disks 22 is transmitted to the driving wheels via an output gear 2.

Although this toroidal type continuously variable transmission of the present invention is a CVT of the half toroidal type which has a double cavity, the present invention can also be applied to other types of toroidal type continuously variable transmission, for example to a single cavity type toroidal type continuously variable transmission.

Figure 2:
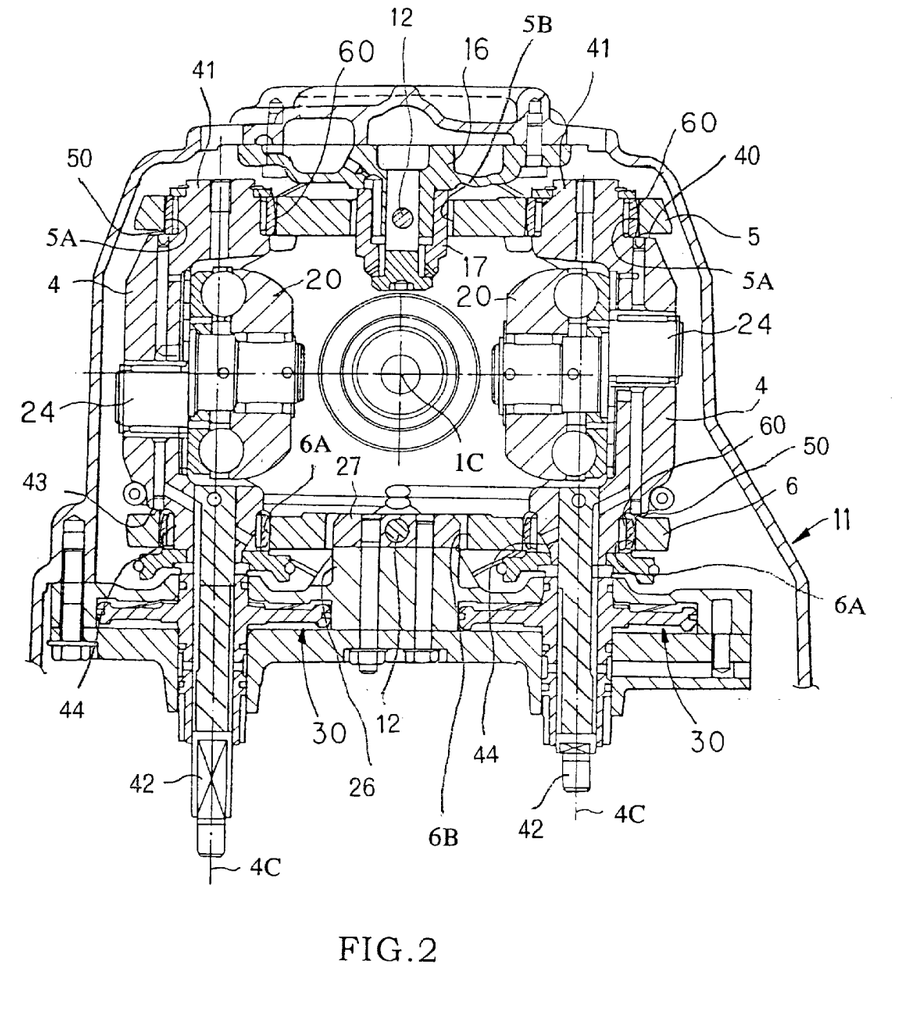
FIG. 2 is a vertical sectional view of the toroidal type continuously variable transmission according to this invention.

Referring to FIG. 2, the pair of trunnions 4 is arranged on either side of the input shaft 1 of the input disks 21 and the output disks 22. The trunnions 4 freely rotatably support the power rollers 20 via pivot shafts 24 which are capable of individual swinging movement. The trunnions 4 are supported by the upper links 5 and lower links 6 so that their respective positions can be changed both in the axial directions of, and around, their respective rotation axes 4C.

And rods 42 are connected to the lower ends of the trunnions 4. Each of the rods 42 is driven in the upwards and downwards direction by a hydraulic cylinder 30. When the trunnion is displaced in the upwards and downwards direction, the power rollers 20 are rotationally displaced around the rotation axes 4C. This displacement will be termed "gyration". The result of gyration is that the contact radiuses between the power rollers 20 and the input disks 21 and the output disks 22 change, so that the speed change ratio changes continuously.

Accompanying the transmission of torque by the power rollers 20, the input disks 21 and the output disks 22 exert thrust forces upon the power rollers 20 in directions away from the input shaft 1. In opposition to these thrust forces, the upper links 5 and the lower links 6 keep the distance between the rotation axes 4C of the trunnions 4 almost constant.

Figure 3:
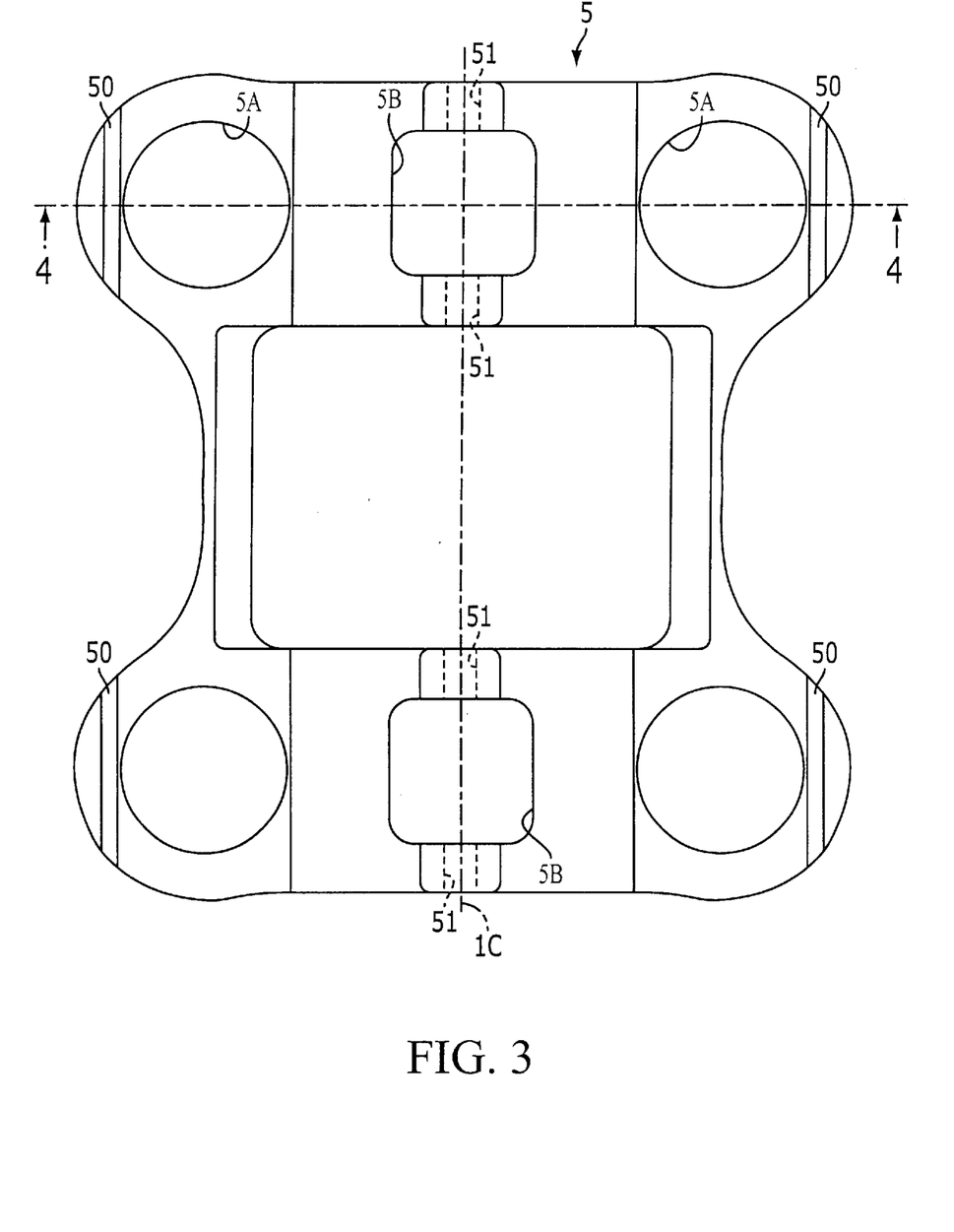
FIG. 3 is a bottom view seen an upper link according to this invention.
Figure 4:
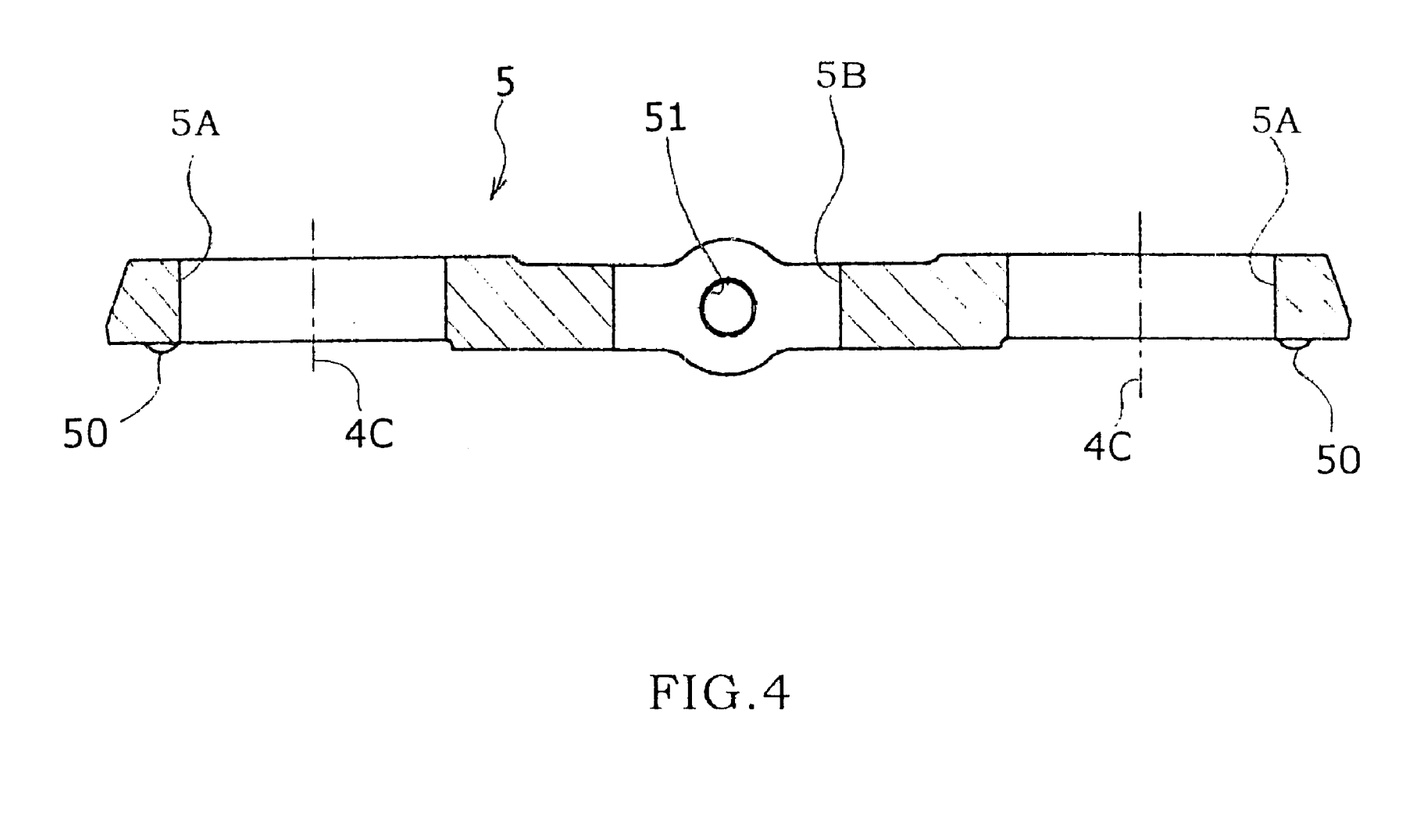
FIG. 4 is a sectional view of the upper link taken in a plane shown by the arrows 4—4 in FIG. 3.
Figure 5:
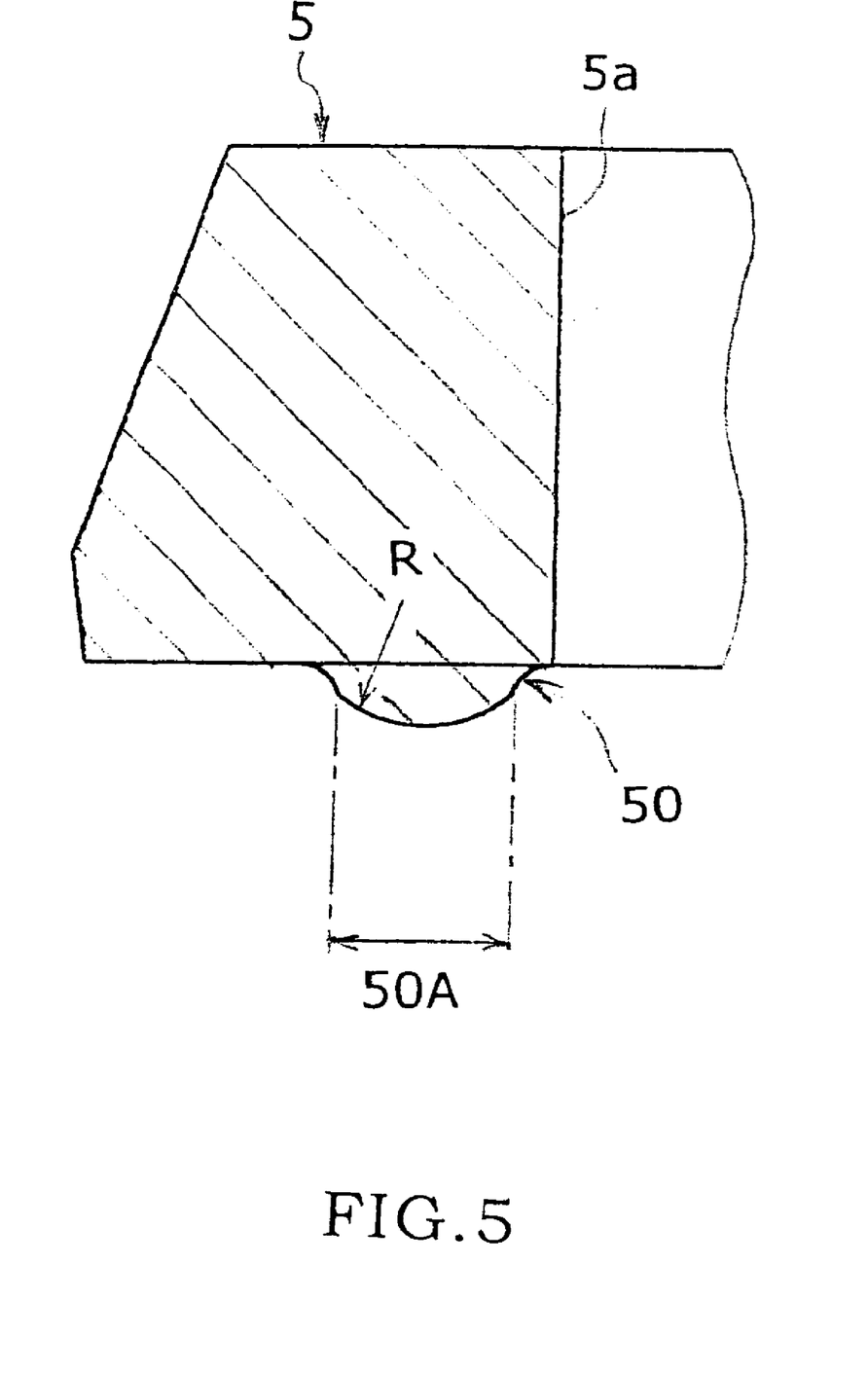
FIG. 5 is an enlarged sectional view of a projecting portion of the upper link according to this invention.

Referring to FIG. 2, FIG. 3, and FIG. 5, a through hole 5B is formed in the central portion of the upper link 5. The upper link 5 is connected via a pin 12 to an upper link post (support member) 17 which passes through the through hole 5B. Further, the upper link post 17 is connected to a post base 16 which is fixed to an upper inner circumferential portion of the casing 11.

The pin 12 is provided so as to project from the upper link post 17 in parallel with the input shaft 1. Referring to FIG. 5, the pin 12 engages with a pin hole 51 which is formed in the upper link 5 in parallel with the input shaft 1. In this manner, the upper link 5 is supported upon the upper link post 17 so as to be capable of swinging movement.

On the other hand, through holes (aperture portion) 5A are formed in the both side of through hole 5B of the upper link 5. Shafts 41, which project upwards in FIG. 2 from shoulder portions 40 provided at the upper ends of the trunnions 4, are passed through the through holes 5A. Furthermore, spherical joints 60 with spherical surfaces shown in FIG. 3 are fitted around the outer surfaces of these shafts 41. The trunnions 4 and the upper link 5 are connected together via the spherical joints 60. It should be understood that the spherical joints 60 comprise needle roller bearings around their inner surfaces.

On the other hand, a through hole 6B is formed in the central portion of the lower link 6. The lower link 6 is connected via a pin 12 to a lower link post 27 which passes through the through hole 6B. Further, the lower link post 27 is connected to the housing 11 via a post base 26 and a housing of the hydraulic cylinder 30.

The pin 12 is provided so as to project from the lower link post 27 in parallel with the input shaft 1. The pin 12 engages with a pin hole which is formed in the through hole 6B of the lower link 6. In this manner, the lower link 6 is supported upon the lower link post 27 so as to be capable of swinging movement.

Through holes 6A are formed at both sides of the through hole 6B of the lower link 6. Shafts 44, which project in the downward direction in FIG. 2 from shoulder portions 43 which are formed on the lower end portions of the trunnions 4, are passed through the through holes 6A. Spherical joints 60 with spherical surfaces are fitted around the outer surfaces of these shafts 44. The inner surfaces of the spherical joints 60 are contacted to the shafts 44 via needle roller bearings, and their outer peripheries which are formed as curved surfaces are contacted to the inner surfaces of the through holes 6A.

Moreover, the rods 42 which connect the trunnions 4 and the hydraulic cylinders 30 are engaged with the inner peripheral end portions of the shafts 44.

By doing this, the two trunnions 4 which are connected to the upper link 5 and the lower link 6 are displaced in opposite directions along the axial direction. Further, the trunnions 4 are allowed by the spherical joints 60 to rotate around the rotation axes 4C.

Next, the structure of the upper link 5 and the lower link 6 will be explained in detail. It should be understood that the upper link 5 and the lower link 6 are of identical form, and accordingly in the following explanation only the upper link 5 will be discussed.

Referring to FIG. 3, four through holes 5A are provided in the upper link 5, and these are formed in symmetrical positions on left and right with the input shaft 1 in the middle. On the other hand, through holes 5B are formed in central positions between the left and right through holes 5A, for the upper link posts 17 to be inserted hereinto.

Referring to FIG. 2 through FIG. 5, the projecting portions 50 are provided in the vicinities of the outer sides of each of the through holes 5A on the lower surface of the upper link S. The projecting portions 50 are positioned facing the shoulder portions 40 of the trunnions 4, and can contact slidably thereagainst. Each of the projecting portions 50 is arranged parallel to the input shaft 1.

In their sectional shapes, the projecting portions 50, as shown in FIG. 5, are formed as sectors of circles with arcuate faces 50A having a predetermined radius R.

When the trunnions 4 perform speed changing by varying their positions in mutually opposite axial directions, the upper links 5 execute swinging movement according to relative movement of the opposing trunnions 4. And, if the displacements in the axial direction of the trunnions 4 become great, the projecting portions 50 come to contact slidably into the shoulder portions 40 of the trunnions 4.

Since the arcuate faces 50A of the projecting portions 50 contact slidably into the shoulder portions, it is possible to minimize the sliding resistance. Furthermore, it is possible to make these sliding resistances equal, since each of the projecting portions 50 is made to have the same arcuate face 50A. Accordingly, it is possible to prevent the occurrence of hysteresis in the speed change characteristic, and it is easily possible to guarantee the accuracy of speed change control.

It should be noted that it is possible to form the lower link 6 with the same projecting portions 50 and arcuate faces 50A as the upper link 5.

Further, even if variation has occurred in the radius of curvature or the like of the arcuate faces 50A, there is no question of corner portions biting against the shoulder portions 40, since there is no sliding of any sharp corner portions against the shoulder portions 40. Accordingly it is possible to prevent the increase of sliding resistance, and it is possible to suppress hysteresis in the speed change characteristic of the transmission.

Figure 6:
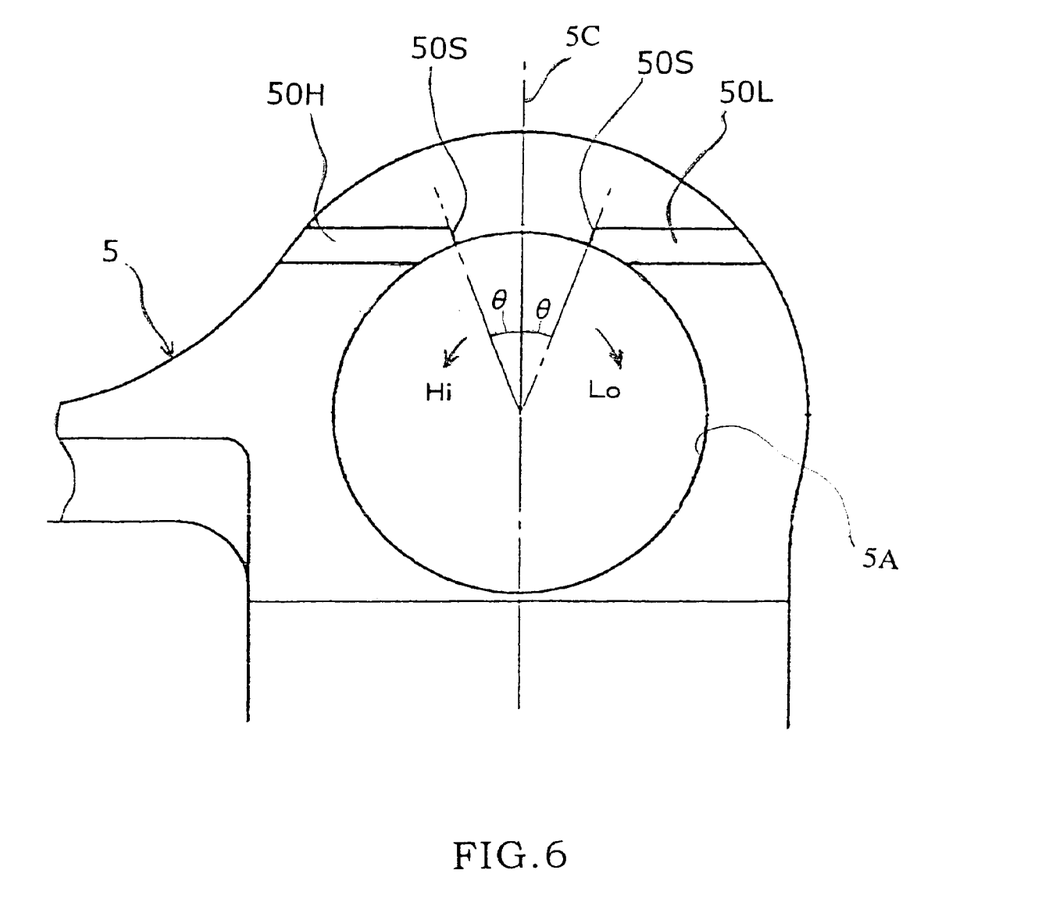
FIG. 6 is a bottom view seen of a main portion of an upper link according to a second embodiment of this invention.

Referring to FIG. 6, this shows a second embodiment of the present invention, in which the positional arrangement of the projecting portions provided with arcuate faces is modified from that in the first embodiment. In this embodiment, when the projecting portions contact slidably into the shoulder portions 40, they are arranged so as to be near to the center of the relative swinging movement of the trunnions 4 and the upper link 5, irrespective of the gyrating angles of the trunnions. Moreover, each of the projecting portions is divided into two projecting portions 50L and 50H which lie on opposite sides of the through hole 5A. Apart from these matters, the construction of this second embodiment is identical to that of the first embodiment.

If the projecting portions 50L and 50H are brought close to the center of the relative swinging movement of the trunnions in this manner, it is possible to reduce the sliding resistance. For this reason, the projecting portions 50L and 50H are formed so as to be separated by the through hole 5A.

The through holes 5A shown in FIG. 6 are formed so as to correspond to the one of the through holes 5A shown at the upper left or at the lower right of FIG. 3. The projecting portion 50L contact slidably into the shoulder portion 40 of its trunnion 4 when its power roller 20 is gyrated to the Lo speed change ratio side (clockwise as seen in FIG. 6). Further, the projecting portion 50H contact slidably into the shoulder portion 40 of its trunnion 4 when its power roller 20 is gyrated to the Hi speed change ratio side (anticlockwise as seen in FIG. 6). It should be understood that the sectional shapes of the projecting portions 50L and 50H are circular sectors, just as was the case for the projecting portions 50 of the first embodiment, and their end portions which can contact the shoulder portions 40 are formed with arcuate faces 50A.

With these projecting portions 50L and 50H which are divided into two, the mutually confronting short sides 50S are formed to follow along radiuses of the through holes 5A, i.e. to follow along radiuses of the shaft portions 41 of the trunnions.

Let the central line which joins the centers of the through holes 5A corresponding to opposing trunnions 4 be designated as 5C. The short sides 50S are formed along lines which prolong those radiuses which subtend a predetermined angle θ with respect to this central line 5C.

Accordingly, when the projecting portions 50L and 50H contact slidably into the shoulder portions 40 of the trunnions 4 due to swinging movement of the upper link 5, the short sides 50S contact slidably so as to be perpendicular to the tangent directions of the rotating shoulder portions 40. Due to this, point contact sliding is prevented, and the short sides 50S and the shoulder portions 40 contacts linearly. Accordingly, it is possible reliably to prevent increase of the sliding resistance. Further, it is possible to make the sliding resistance generated by the projecting portions 50L and 50H uniform. Accordingly it is possible to prevent the generation of hysteresis in the speed change characteristic of the transmission.

According to FIG. 7 through FIG. 10, in a third embodiment the corner portions of the short sides 50S of the second embodiment are formed as arcuate faces 50B. Apart from this feature, the structure is the same as in the second embodiment.

Figure 7:
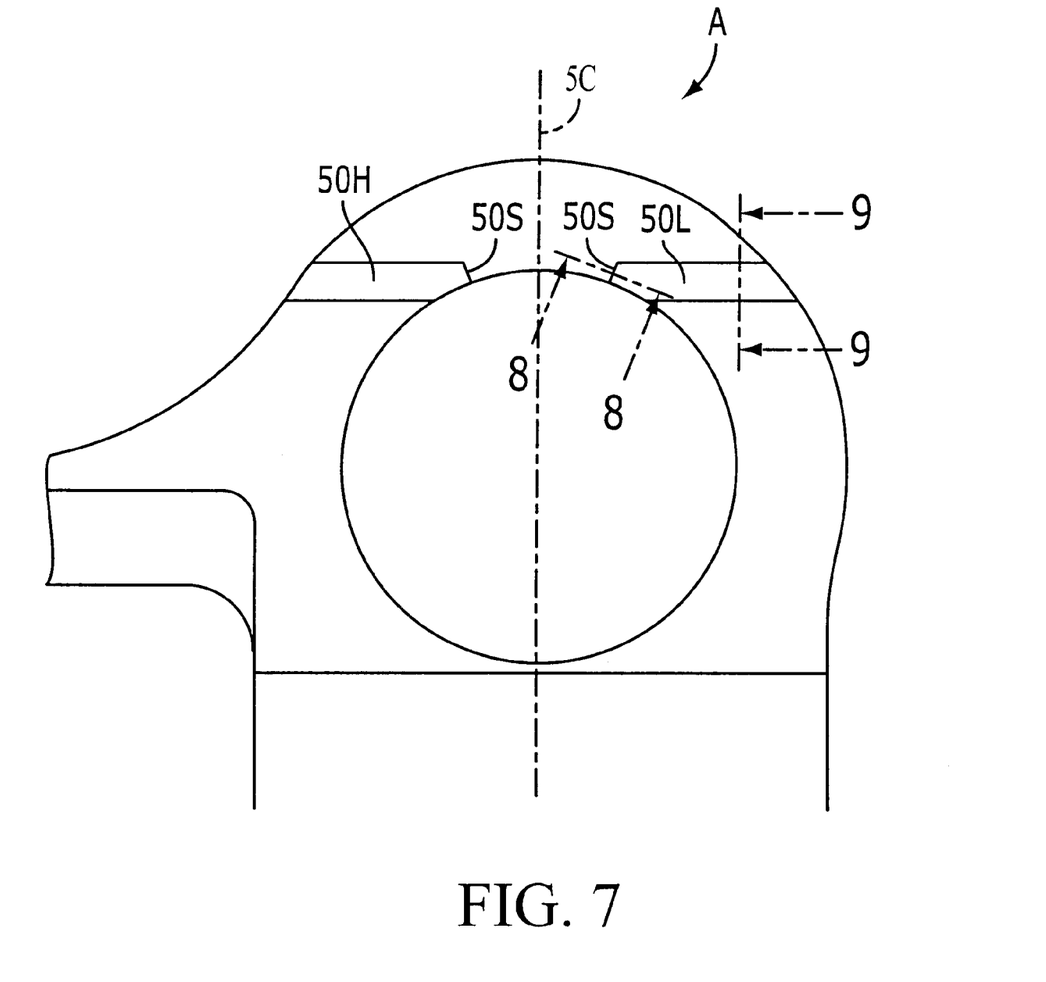
FIG. 7 is similar to FIG. 6, and is a bottom view seen a main portion of an upper link, showing a third embodiment of this invention.
Figure 10:
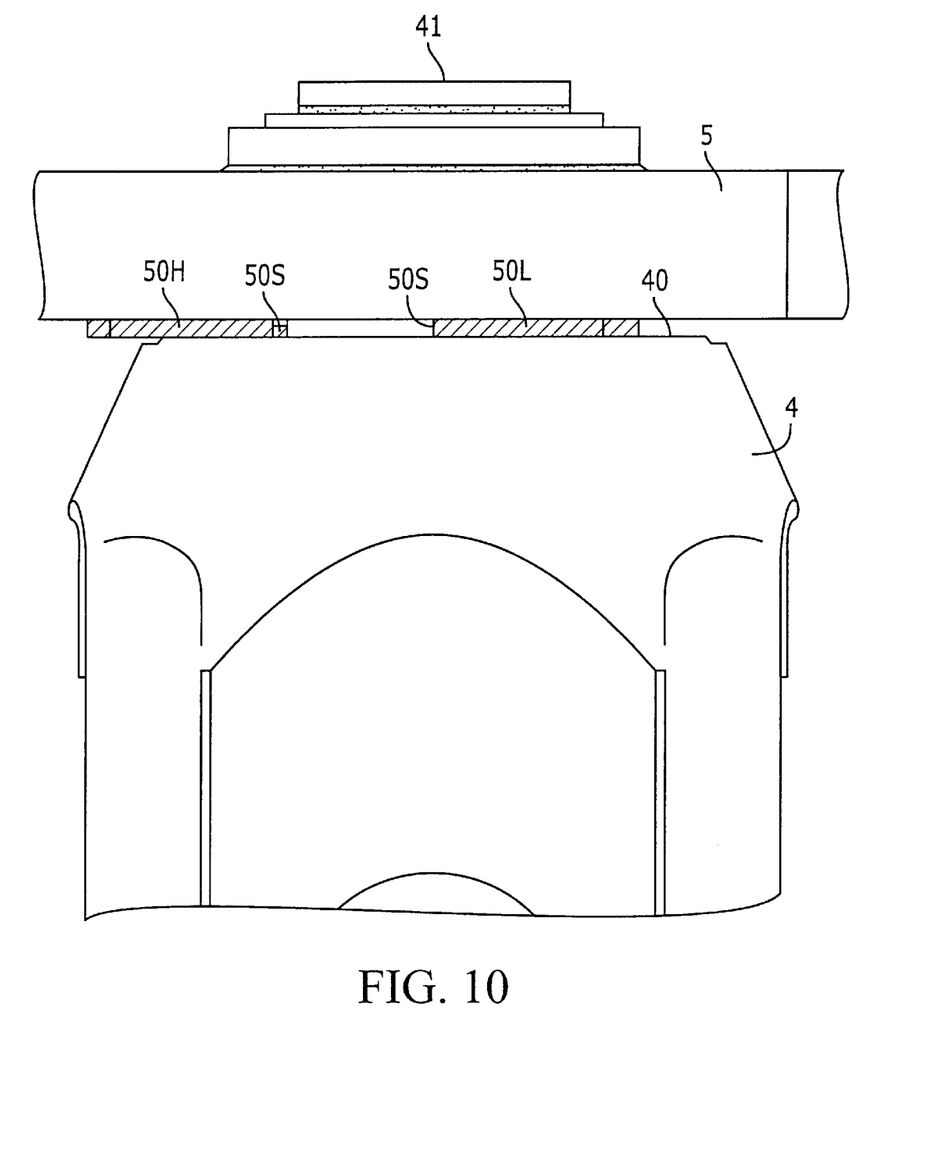
FIG. 10 is a view showing the relationship between projections, short sides, and the trunnion shoulder portion from the direction of the arrow A in FIG. 7.

FIG. 10 is a view along direction A of FIG. 7 that shows the relationship between the projecting portions 50H and 50L, the short sides 50S, the shoulder portion 40 of the trunnion 4, and the upper link 5.

Figure 8:
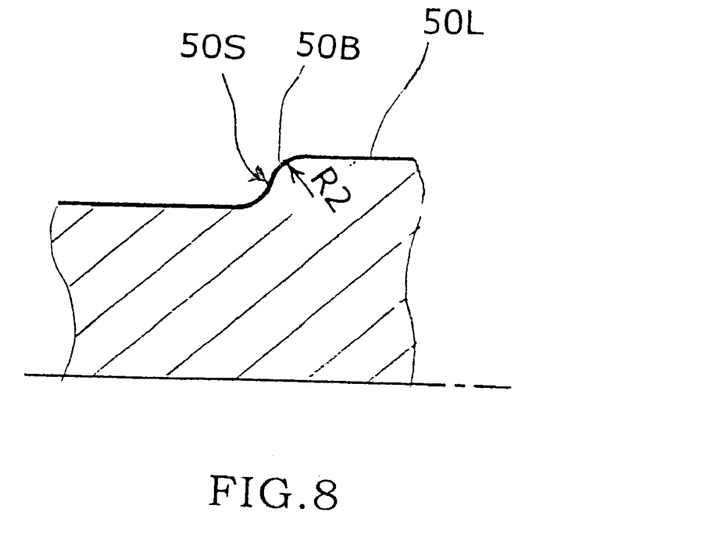
FIG. 8 is an enlarged sectional view of a projecting portion of the upper link taken in a plane shown by the arrows 8—8 in FIG. 7.
Figure 9:
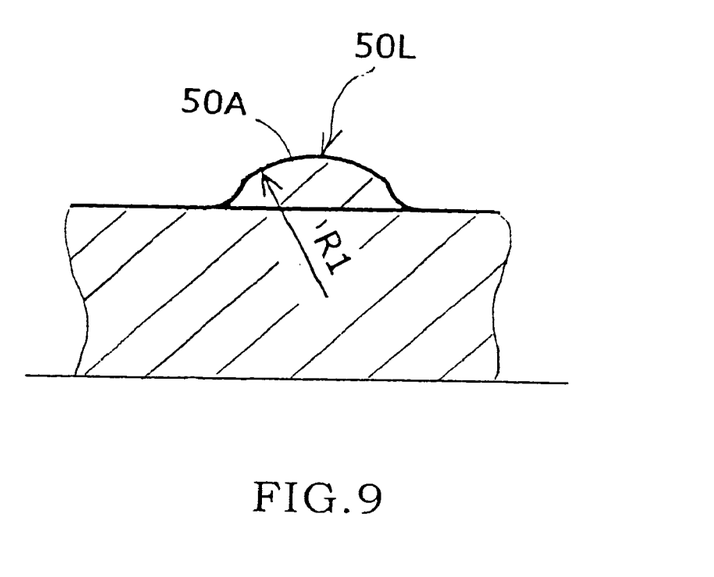
FIG. 9 is an enlarged sectional view of a projecting portion of the upper link taken in a plane shown by the arrows 9—9 in FIG. 7.

According to FIG. 9, for the cross sections of the long sides of the projecting portions 50L and 50H (the sides in the horizontal direction in FIG. 7), the outer peripheral end portions are formed with arcuate faces of radius R1. Furthermore, according to FIG. 8, the corner portions of the short sides 50S which mutually oppose one another are formed with arcuate faces 50B of radius R2. It should be understood that radius R1 is greater than radius R2.

It is possible easily to make uniform the sliding resistance which each projecting portion 50 imparts to its trunnion 4 when the plurality of projecting portions 50 start to contact slidably into their respectively opposing shoulder portions 40 of the trunnions 4, since the corner portions of the short sides 50S are formed with the arcuate faces of radius R2. Furthermore, even though the projecting portions 50L and 50H which are provided to the upper link 5 and the lower link 6 are formed as divided so that they lie on either side of the through holes 5A, it is possible to prevent the occurrence of hysteresis in the speed change characteristic of the transmission, and it is possible easily to ensure accuracy of the speed change control.

Next, since the radius R1 of the arcuate faces 50A is set to be greater than the radius R2 of the arcuate faces 50B, during contacting slidably between the upper link 5 and the shoulder portions 40, larger arcs of the long sides contact into the shoulder portions 40. Accordingly reduction of the contact pressures between the contacting areas can be anticipated, and accordingly it is possible to count upon reduction of the sliding resistance.

Although the case of the projecting portions 50L was shown in FIG. 8 and FIG. 9, the opposite projecting portions 50H also are formed with arcuate faces in the same manner.

It should be noted that, although in the above embodiments by way of example the projecting portions 50 were shown as being provided both to the upper link 5 and also to the lower link 6, it would be acceptable to provide such projecting portions to one or the other of these links, only, and it would still be possible to anticipate reduction and equalization of the sliding resistance.

Further, although by way of example the end portions of the projecting portions were shown as being formed with arcuate faces of radius R, it would be acceptable to form them as having any curved surface, and it would be possible to obtain the same function and results as described above.

The contents of Japanese Application No. 11-271859, with a filing date Sep. 27, 1999, are hereby incorporated by reference.

What is claimed is:

1. A toroidal type continuously variable transmission, comprising:
   a rotational input shaft;
   an input disk arranged coaxially with said rotational input shaft and is driven thereby;
   an output disk arranged coaxially with said rotational input shaft and opposes said rotational input disk;
   a pair of trunnions arranged in opposite positions on both sides of said rotational input shaft, each of said trunnions comprising rotation shafts formed at both end portions of said trunnion, and offset portions which are offset by a predetermined amount from said rotation shafts between said rotation shafts of said trunnion, said trunnion movable in its axial direction of said rotation shafts and also around its axial direction of said rotation shafts;

an actuator which drives each of said pair of said trunnions in the mutually opposite axial direction of the trunnions;

power rollers which are supported by said trunnions and are gripped between said input disk and said output disk;

links each of which is respectively formed with through holes into which said respective rotation shafts of said trunnions are inserted;

spherical joints provided between the outer peripheries of said rotation shafts and said through holes;

shoulder portions formed on said trunnions opposing said links; and projecting portions formed upon said links and capable of contacting slidably into said shoulder portions of said trunnions when said links execute swinging movement, wherein end portions of said projecting portions are formed with arcuate faces, and wherein said projecting portions are formed as separated first and second projecting portions which lie on opposite sides of said through holes, said first and second projecting portions have mutually confronting short sides, and these short sides are formed along radial directions of said through holes.

2. A toroidal type continuously variable transmission according to claim 1, wherein said projecting portions are formed parallel to said rotational input shaft upon said links.

3. A toroidal type continuously variable transmission according to claim 1, wherein corner portions of said short sides of said projecting portions which can contact slidably into said shoulder portions of said trunnions are formed with arcuate faces.

4. A toroidal type continuously variable transmission according to claim 3, wherein the arc radius (R1) of said arcuate faces of said projecting portions formed parallel with said rotational input shaft on said links which can contact slidably into said shoulder portions of said trunnions is set to be greater than the arc radius (R2) of said arcuate faces of said short sides.

* * * * *